Feb. 24, 1959  A. L. GOOD  2,874,924
VALVE
Filed July 18, 1957  2 Sheets-Sheet 1

INVENTOR.
ARTHUR L. GOOD
BY M. A. Hobbs
ATTORNEY

Feb. 24, 1959    A. L. GOOD    2,874,924
VALVE

Filed July 18, 1957    2 Sheets-Sheet 2

INVENTOR.
ARTHUR L. GOOD
BY M. A. Hobbs
ATTORNEY

United States Patent Office 2,874,924
Patented Feb. 24, 1959

2,874,924

VALVE

Arthur L. Good, Goshen, Ind., assignor to Mairco, Inc., Goshen, Ind., a corporation of Indiana Application July 18, 1957, Serial No. 672,644

5 Claims. (Cl. 251—58)

The present invention relates to valves and more particularly to valves for controlling the flow of fluids in response to variations in temperature and/or pressure.

One of the principal objects of the present invention is to provide a temperature and/or pressure sensitive valve structure which will readily respond to predetermined variations in temperature or pressure and which can be accurately set to open and close at the preselected temperatures and pressures.

Another object of the invention is to provide a valve structure adapted to operate in response to variations in temperature and/or pressure, which can readily be assembled, checked and tested and which can easily be adjusted to various conditions to which the valve is to respond.

A further object of the invention is to provide, in a temperature or pressure responsive valve controlled in part by a spring, a means for decreasing the rates and minimizing the effect of variations in spring tension or compression occurring during the operation of the valve.

Still another object of the invention is to provide a valve employing a diaphragm or other sealing membrane structure for controlling the effective pressures on the valve element, which permits ready detection of leaks and other service defects and which can easily be serviced and repaired and the defective parts replaced without any special tools, equipment, or experience being required.

Another object is to provide a valve having a structure and operating principle which are unaffected by grit and other foreign particles in the fluid passing through the valve passages and around the valve element.

Another object is to provide a valve having a body structure which can readily be visually inspected and the parts thereof easily reached for assembling and servicing.

Additional objects and advantages will become apparent from the following description and accompanying drawings, wherein.

Figure 1:
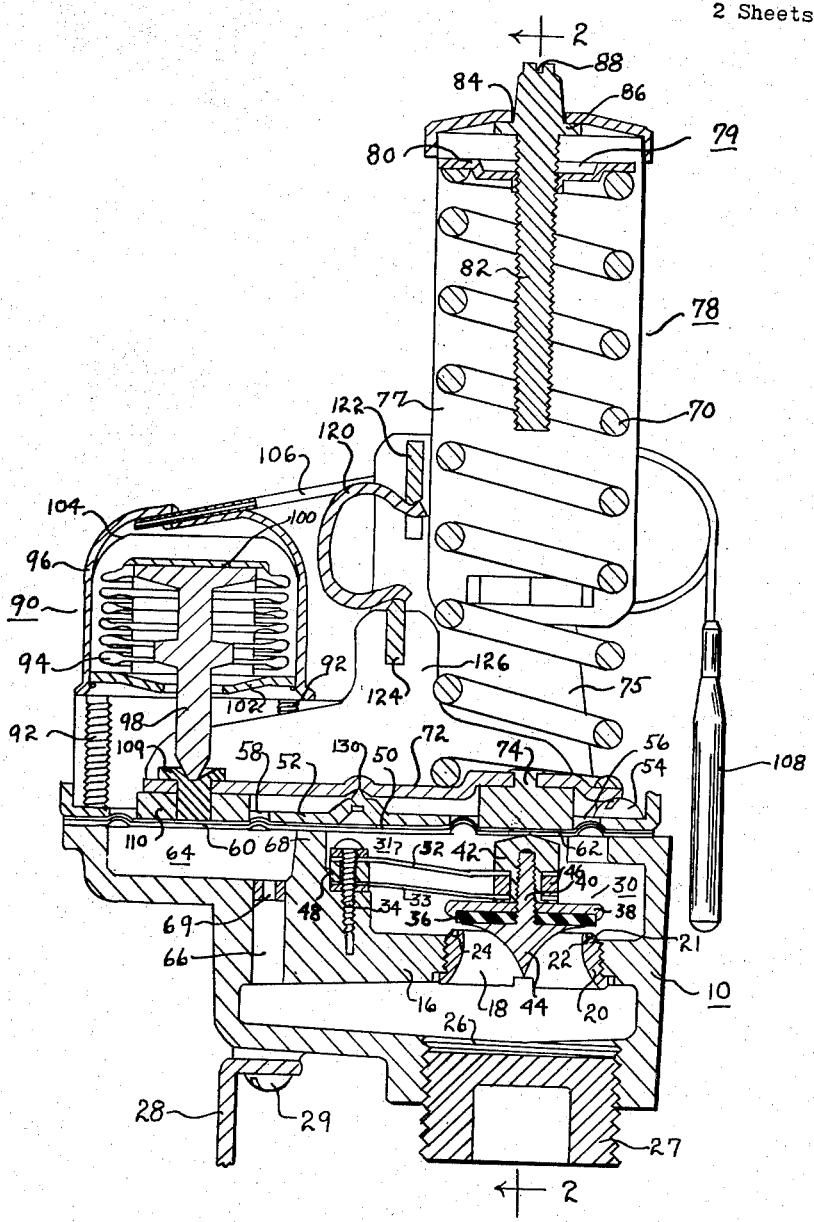
Figure 1 is a vertical cross sectional view of my valve showing the parts thereof in operative relationship.
Figure 2:
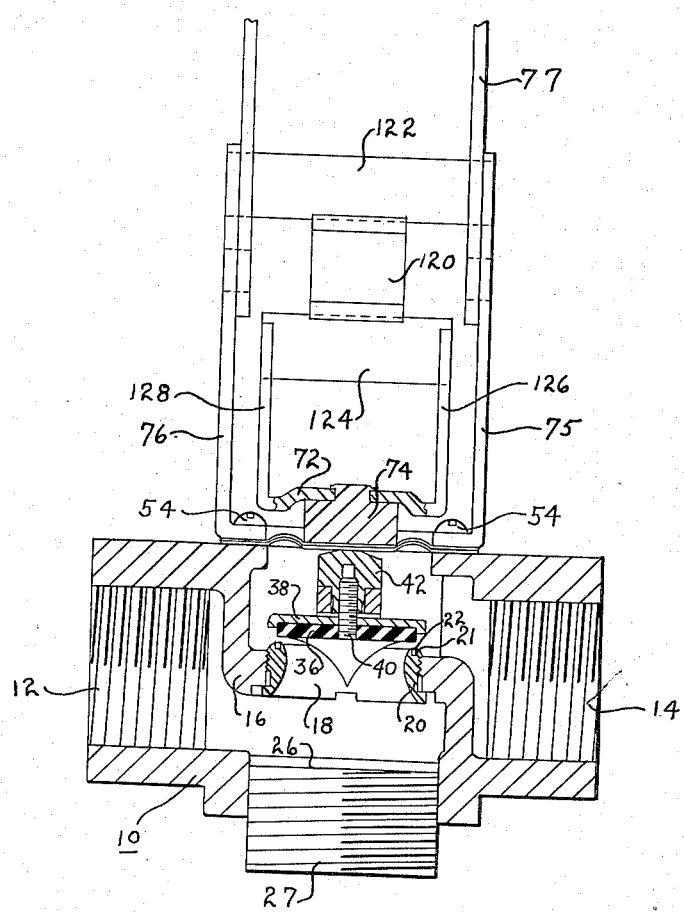
Figure 2 is a vertical cross sectional view of the valve shown in Figure 1, taken on line 2—2 thereof with the large coil spring removed to better show other details of the structure.
Figure 3:
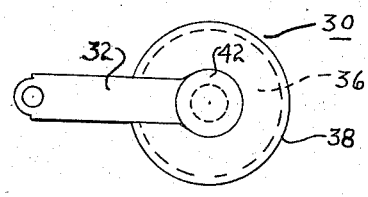
Figure 3 is a top plan view of the valve element assembly removed from the valve body.

Referring more specifically to the drawings, numeral 10 designates the valve body having a fluid inlet passage 12 and the fluid outlet passage 14, said passages being threaded to be connected into a fluid line such as the water conduits to the condenser of a refrigerating system. The inlet and outlet passages are separated by a partition 16 containing a port 18 connecting the inlet and outlet passages and having a valve insert 20 threaded thereinto. The upper surface 21 of the insert forms the valve seat and is provided with a ring 22 preferably of nylon seated in an annular groove 24 in said upper surface. To facilitate the machining, assembling and servicing operations, a hole 26 is provided in the bottom of valve body 10 and is closed during the operation of the valve by a threaded plug 27. The hole permits insert 20 on which the valve seat is located to be readily replaced without otherwise disassembling the valve. A bracket 28 for mounting the valve in a system is attached to the underside of the body by screws 29.

The flow of fluid through port 18 is controlled by a valve element 30 retained in operative position and in alignment with the port by an arm 31 of dual spring construction consisting of leaf springs 32 and 33 secured at one end to the upper center of the valve element and at the other end to a screw or stud 34 rigidly seated in the partition portion of the valve body. The valve element consists of a disc shaped member 36 of rubber or rubber-like material for engaging at its margin ring 22 to form a seal therewith when the valve is closed. Member 36 is seated in a retainer 38 which together with member 36 is attached to arm 32 by a special screw 40 and nut 42, said screw having a head 44 of a large circumference only slightly smaller in diameter than the annular valve seat 21. Leaf springs 32 and 33 are held in spaced relation by spacers 46 and 48 on the valve element and stud, respectively. The two springs in addition to supporting the valve element provide parallel relative movement between the axes of said element and port 18. This valve structure is also substantially frictionless.

The valve body is sealed closed on its upper side by a flexible fluid impervious member 50 clamped along its entire marginal edges between the top surface of the body and the lower surface of a retainer plate 52, the latter being held securely in place by a plurality of screws 54. The retainer plate is provided with two round holes 56 and 58 of diameter approximately equal to the diameter of the valve element to provide in conjunction with member 50, diaphragms 60 and 62 for controlling the effective fluid pressures acting on the valve element. Diaphragm 60 forms one wall of a chamber 64 connected to the fluid inlet passage 12 by a conduit 66 and separated from the fluid outlet passage by a partition 68. Conduit 66 may contain a restriction 69 for retarding the response of diaphragm 60 to variations in the inlet pressure. Diaphragm 60 is subjected to the inlet pressure and diaphragm 62 which forms a wall of the fluid outlet passage is subjected to the outlet pressure.

Valve element 30 is urged toward its closed position by a relatively heavy coil spring 70 operatively connected to the valve element by a lever 72 on which the spring seats, a lug 74 secured to the under side of said lever and contacting the upper side of diaphragm 62, and nut 42 contacting the underside of the diaphragm. The force of the spring is transmitted to the valve element through the diaphragm which permits the valve to move between opened and closed positions. In addition to permitting the forces for operating the valve element to be transmitted from lever 72 the diaphragm cancels out the effect of the outlet pressure acting in the valve closing direction on the upper side of the valve element. Plate 52 is provided with opposed upstanding sides 75 and 76 which together with an inverted U-shaped bracket 77, form a housing 78 for spring 70. Mounted in the upper end of housing 78 is an adjustment mechanism 79 for varying the compression on spring 70, consisting of a rectangular plate-like member 80 seated on the upper end of the spring and having a threaded hole in the center for receiving adjustment screw 82. Member 80 which is held against rotation by contact with the sides of bracket 77 is adapted to move downwardly or upwardly when the screw is rotated to vary the spring compression and hence the force urging valve element 30 toward its closed position. The screw extends through a hole 84 in the top of bracket 77 and is held against longitudinal movement by a collar 86 formed integrally with the head of the screw. A slot 88 is provided in the upper end of the screw for receiving a tool used in making an adjustment.

A fluid motor 90 for operating valve element 30 in response to temperature and/or pressure changes is mounted on the valve body and rigidly secured thereto by a plurality of screws 92 extending downwardly through a portion of the housing of the motor into the top portion of the valve body. The motor consists of a main operating bellows 94 enclosed in a casing 96 and a stem 98 secured to the upper closed end 100 of the bellows and extending downwardly and through the bottom of the motor to lever 72. The bellows is soldered to a disc 102 which in turn is joined to the lower internal wall of casing 96 to form a completely enclosed and sealed chamber 104 defined by casing 96, bellows 94 and disc 102. Stem 98 is adapted to reciprocate upwardly and downwardly as the upper end of the bellows varies its position in response to variations in pressure in chamber 104. The closed upper end of casing 96 is pierced and one end of a capillary tube 106 is inserted therein and sealed in place, in communication with chamber 104. The other end of capillary tube 106 is connected to a thermostat bulb 108 which may be filled with a volatile liquid or a vapor which creates a pressure in the bulb, capillary tube and chamber 104, varying the changes in temperature surrounding the bulb. This pressure within chamber 104 forces the closed upper end 100 of the bellows downwardly and, through stem 98, pivoted lever 72, lug 74 and nut 42, urges valve element 30 toward open position in opposition to the force of spring 70 tending to close the valve element. A socket member 109 for the lower end of stem 98 is provided on lever 72 and is secured to a lug 110 which rests on diaphragm 60. This diaphragm which preferably has an area a little less than the effective area of the valve element opposes the valve opening force exerted by stem 98 on lever 72 in an amount approaching the valve opening force of the fluid inlet pressure on the underside of the valve element.

A spring 120 is mounted between a cross bar 122 supported by sides 75 and 76 of housing 78 and a cross bar 124 supported by upstanding side members 126 and 128 of lever 72, and seats and holds lever 72 firmly on its pivot point 130 and, at the same time, also applies to lever 72 a force having the effect of changing the spring rates of spring 70 and bellows 94 in their operation of valve element 30. Spring 120 is a leaf type spring formed into a partial circle and having its ends shaped into modified hooks for engaging cross bars 122 and 124 for firmly holding the spring in place between said bars. It reacts between the two bars to apply a force on lever 72 on a line in the proximity of pivot point 130, said force being applied first on one side of the fulcrum point and then on the other side, as the valve element moves between closed and fully opened position. As the valve is opened by the fluid motor, spring 120 first applies a decreasing force to lever 72 in the valve closing direction, augmenting the variable force applied by spring 70 to the valve element 30, and then as the line of force of the spring moves across pivot point 130, the spring applies an increasing force to lever 72 in the valve opening direction assisting motor 90. In this spring arrangement the combined spring rates of the fluid motor 90 and springs 70 and 120 approach a constant value, increasing slightly from the fully closed position of the valve to the fully opened position of the valve. In this arrangement the pressure differential required to move the valve element from its fully closed to its fully opened position has been greatly reduced, thus making the valve readily responsive to the predetermined temperature at which the valve becomes operative.

With only minor modifications in the valve structure the valve can be converted into a snap-acting type. By increasing the force of spring 120 beyond a readily determinable point the valve element will remain in closed position until the force exerted by motor 90 has increased to the point where it can overcome springs 70 and 120. When this point is reached the valve then snaps to its fully opened position. In the present valve, a spring having an effective force of less than that required to make the valve operate as a snap-acting type is normally employed. Further, the valve structure can be modified by eliminating spring 70 and using spring 120 as the sole spring force urging the valve element to its seat.

In the operation of my valve installed, for example, in the water cooling line to the condenser of a refrigeration system, valve element 30 is held on its seat 21 by springs 70 and 120 until the temperature surrounding bulb 108 rises to the point where the pressure in chamber 104, acting through stem 98, lever 72, lug 74 and nut 42 can overcome the force of said springs and raise the valve element off its seat. The point at which the valve element is lifted from its seat and the degree to which the element is lifted depend on the temperature of the fluid being sensed by bulb 108 and the setting maintained on spring 70 by adjustment mechanism 79. The adjustment mechanism covers a wide range of temperatures and/or pressures and can be readily adjusted to the desired temperature or pressure by merely rotating screw 82 with an instrument inserted in slot 88. The fluid on entering the valve body flows through passage 66 into chamber 64 beneath diaphragm 60 to offset at least in part the effect of the inlet pressure on the underside of valve element 30 tending to raise the element from its seat. When the temperature of the fluid surrounding bulb 108 drops below the selected temperature as determined by the setting on adjustment mechanism 79, the pressure in chamber 104 can no longer overcome the force exerted by spring 70 and this spring alone first moves the valve element toward its closed position and is then assisted by spring 120 when the line of force of said latter spring moves from the left to the right side of pivot point 130, as seen in Figure 1.

Various changes and modifications can be made in the invention shown and described in detail herein. For example, and as indicated previously herein, the temperature responsive fluid motor and a pressure responsive motor are readily interchangeable, without otherwise modifying the construction and operation of the valve. Also other types of motors and mechanisms, such as for example a solenoid, a motor driven cam, or a bimetal heat motor, may be substituted for the fluid motor. Further, the mechanism consisting of the fluid motor, lever 72, springs 70 and 120 and the brackets therefor can be reversed in position and operation; i. e., the fluid motor placed above the valve element for urging the element toward closed position and spring 70 placed above chamber 64 for urging the valve element toward opened position.

In regard to lever 72 the pivot point may be located at one end and fluid motor 90 and spring 70 positioned on the same side of the pivot point in opposition to one another. In this type of arrangement, as well as in most other lever arrangements, the requirement of spring 120 is that it be so positioned in relation to the pivot point of the lever that its line of force shift from one side of the pivot to the other as the valve is opened and closed. For example, said spring may apply its force onto the end of the lever substantially parallel therewith.

In some arrangements the line of force of spring 120 may approach the pivot point without passing beyond as previously described and still obtain a substantial reduction in the pressure differential required to move the valve element between its fully closed and its fully opened positions.

The desired effective reduction in spring rate and the consequent reduction in the aforementioned pressure differential can be obtained by other spring or resilient means such as an over center spring loaded roller and other spring loaded means having a reducing force characteristic approaching a neutral force position as the valve moves between closed and opened positions.

Many other changes can be made without departing from the scope of the invention.

I claim:

1. A temperature and/or pressure responsive valve, comprising a body having a fluid inlet passage and a fluid outlet passage, a partition in said body betwen said passages having a port therethrough, a removable annular insert in said port having a valve seat thereon on the outlet side thereof, a valve element adapted to engage said seat, a resilient arm for guiding said element toward and away from said seat, a flexible diaphragm in axial alignment with said port on the outlet side thereof, a member operatively connecting said element with said diaphragm, a pivoted lever having one end operatively connected with said diaphragm for operating said valve element, a coil compression spring operatively connected with said lever on the same end as said diaphragm, a second relatively strong short thrust spring and means operatively connecting said second spring to said lever so that its line of force shifts from one side of the pivot point of said lever to the other for first urging said element toward its seat and then for urging said element away from its seat as the valve is opened, a means for adjusting the tension on said coil spring, a fluid motor having a stem operatively connected to said lever on the end opposite said springs and acting in opposition to said springs, and a fluid chamber connected to said inlet passage and having a diaphragm operatively connected to said lever on the side opposite said stem and on the corresponding end thereof.

2. A temperture and/or pressure sensitive valve, comprising a body having a fluid inlet passage and a fluid outlet passage, a partition in said body between said passages having a port therethrough, a valve seat around said port on the outlet side thereof, a valve element adapted to engage said seat, a flexible diaphragm in axial alignment with said port on the outlet side thereof, a member operatively connecting said element with said diaphragm, a pivoted lever having one end operatively connected with said diaphragm for operating said valve element, a spring operatively connected with said lever on the same end as said diaphragm, a second relatively strong short thrust spring and means operatively connecting said second spring to said lever so that its line of force shifts from one side of the pivot point of said lever to the other as the valve is opened, a fluid motor operatively connected to said lever on the end opposite said springs and acting in opposition to said springs, and a fluid chamber connected to said inlet passage and having a diaphragm operatively connected to said lever on the side opposite said motor and on the corresponding end thereof.

3. A temperature and/or pressure sensitive valve, comprising a body having a fluid inlet passage and a fluid outlet passage, a partition in said body between said passages having a port therethrough, an annular insert in said port having a valve seat thereon on the outlet side thereof, a valve element adapted to engage said seat, an arm of two leaf springs for guiding said element toward and away from said seat, a flexible diaphragm in axial alignment with said port on the outlet side thereof, a member operatively connecting said element with said diaphragm, a pivoted lever having one end operatively connected with said diaphragm for operating said valve element, a coil compression spring operatively connected with said lever on the same end as said diaphragm, a second relatively strong spring operatively connecting said second spring to said lever so that its line of force shifts from one side of the pivot point of said lever to the other as the valve is opened, and a fluid motor having a stem operatively connected to said lever on the end opposite said springs and acting in opposition to said springs.

4. A valve, comprising a body having a fluid inlet passage and a fluid outlet passage, a partition in said body between said passages having a port therethrough, a valve seat around said port on the outlet side thereof, a valve element adapted to engage said seat, a flexible diaphragm in axial alignment with said port on the outlet side thereof, a member operatively connecting said element with said diaphragm, a pivoted lever having one end operatively connected with said diaphragm for operating said valve element, a spring operatively connected with said lever, a second spring and means operatively connecting said second spring to said lever so that its line of force shifts from one side of the pivot point of said lever to the other as the lever is operated, and a fluid motor operatively connected to said lever on the end opposite said springs and acting in opposition to said springs.

5. A valve, comprising a body having a fluid inlet passage and a fluid outlet passage, a partition between said passages having a port therethrough, a valve seat around said port, a valve element adapted to engage said seat, a flexible diaphragm in axial alignment with said port on the outlet side thereof, a member operatively connecting said element with said diaphragm, a pivoted lever having one end operatively connected with said diaphragm for operating said valve element, a spring operatively connected with said lever on the same end as said diaphragm, a second relatively strong short thrust spring and means operatively connecting said second spring to said lever so that its line of force shifts from one side of the pivot point of said lever to the other as the lever is operated, and a fluid motor operatively connected to said lever on the end opposite said springs and acting in opposition to said springs.

References Cited in the file of this patent

UNITED STATES PATENTS

| | | |
|---|---|---|
| 1,160,864 | De Vaughn | Nov. 16, 1915 |
| 1,450,236 | Anderson | Apr. 3, 1923 |
| 1,776,401 | Thompson | Sept. 23, 1930 |
| 2,214,272 | Dillman | Sept. 10, 1940 |
| 2,743,738 | Johnson | May 1, 1956 |

FOREIGN PATENTS

| | | |
|---|---|---|
| 524,599 | Germany | May 9, 1931 |